Oct. 27, 1936.  A. J. HORTON  2,058,589
DRIVING AND BRAKE MECHANISM
Filed Jan. 23, 1932
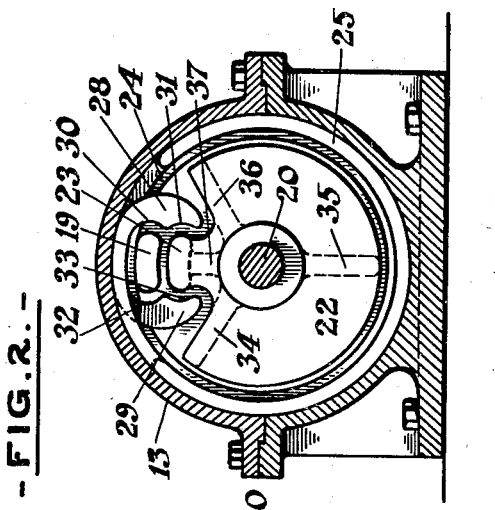
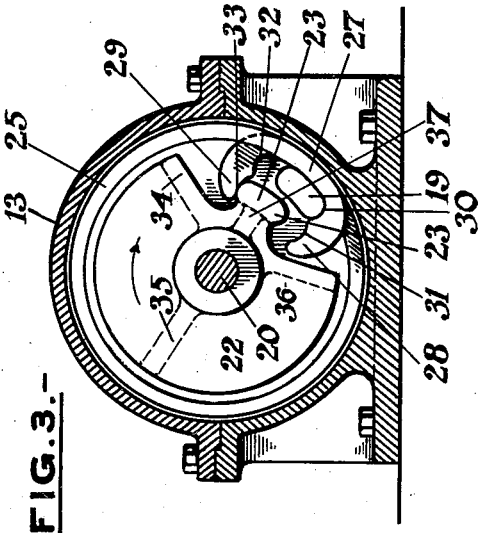
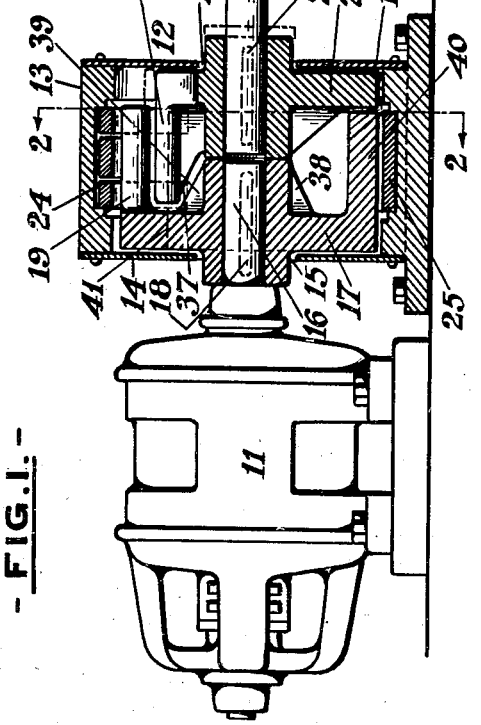
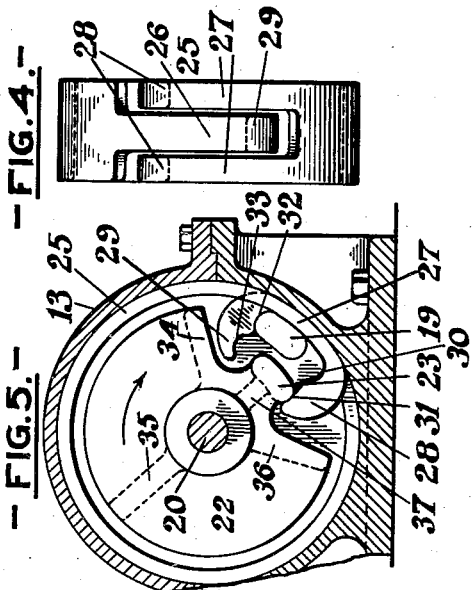
INVENTOR
*Albert J. Horton*

Patented Oct. 27, 1936

2,058,589

UNITED STATES PATENT OFFICE 2,058,589

DRIVING AND BRAKE MECHANISM

Albert J. Horton, White Plains, N. Y., assignor to R. Hoe & Co., Inc., New York, N. Y., a corporation of New York; Irving Trust Company, permanent trustee Application January 23, 1932, Serial No. 588,253

21 Claims. (Cl. 192—8)

The invention relates to a driving shaft adapted to be rotated by any suitable form of motor, and another shaft preferably coaxially arranged and adapted to be driven thereby. The driving shaft is provided with a crank disk or crank arm secured thereto and adapted to rotate therewith and, at a distance from its rotation axis, means are provided for cooperative contact with the ends of a substantially circular brake band, which preferably is normally adapted to expand against a corresponding seat in the fixed drum or shell of the housing. This brake band thus acts in an expanding manner to produce a braking effect in cooperation with its encircling drum. This crank disk is also provided with a substantially annular flange portion, preferably made integral therewith, and the ends of the spring brake band, above referred to, may be hooked into slots in said flange and adapted to contact with a projection or pressure pin either secured to or forming an integral part of said driving disk or crank.

This pressure pin is preferably made of oval cross section or wider than its thickness so that its width will add to its stiffness and strength and better resist the forces to which it is subjected. The driven shaft is provided with a similar crank disk or arm and has a similar pressure pin and means of operatively contacting it with the ends of the brake band. The contact portions or the pressure pin of the driven shaft may be located nearer to the axis of the shafts than those of the driving shaft, but these two pressure pins, contacts or connections on the driving and driven crank or disks may either be at the same radial distance from the shaft centers, or either one may be at a greater distance therefrom than the other, as may be preferred.

In the drawing accompanying these specifications, the pressure pin of the driving shaft is shown at a greater distance from the shaft's center than the driven pin, but as above stated they may be arranged otherwise, as will be readily understood.

The shafts are each mounted in suitable bearings and adapted to be rotated in either direction, and when the driving shaft is rotated by the motor, the pressure or driving pin thereof first engages and partially releases one end of the brake band from its normal braking position, and a continuation of the rotation of the driving shaft causes the other end of the brake band to contact with the pressure or driving pin of the driven shaft to thereby fully release the brake and rotate the driven shaft in harmony with the rotation of the driver.

If the motor should be de-energized when the parts are rotating, the driven shaft and its attachments, by reason of their inertia, will tend to continue their rotation after the power has been shut off from the motor. In order to prevent such continued rotation the construction is such that the spring brake band then expands against the inner surface of its cylindrical shell and this causes a deceleration and prompt stoppage of the machinery. This result is due to the very slight resistance which is offered by the rotation of the motor shaft which thus permits the end of the brake band connected thereto, to expand.

One of the objects of the invention is, upon starting the motor, to drive another shaft through the medium of a brake band and to release the braking effect thereof when the drive is completed. In addition to this, another object of the invention is to promptly stop the rotations by the braking action of the brake band.

Another object of the invention is to provide a reversible drive that will prevent the driven member from running backward or in reverse direction from that intended, if and when a limited force is applied to it tending to such reversal. The apparatus will also operate similarly in either direction of rotation.

It will thus be seen that this apparatus is adapted to drive machines that should be stopped promptly for any reason and is particularly useful to prevent the reversal of the operation of hoists, or similar machinery driven by worm gearing or other mechanism that is not irreversible, and a relatively high braking power is not required to hold the load, and for other purposes where such reversal or continuation of motion is objectionable.

Having thus given a general description of the invention and some of its objects, reference will now be made to the annexed sheet of drawings, in which like characters refer to like parts.

Fig. 1 is a side elevation of a motor which, for convenience of illustration, is shown as an electric motor, but the motor can be of any type, and in this view the mechanism is shown in vertical longitudinal sectional elevation;

Fig. 2 is a cross sectional elevation on the line 2—2 of Fig. 1, looking in the direction of the arrows, while the parts are at rest;

Fig. 3 is a cross sectional elevation corresponding to Fig. 2 when the brake is released and the motor is rotating the driving and driven shafts in the direction indicated by the curved arrow;

Fig. 4 is a diametral elevation of the spring brake band by itself and,

Fig. 5 is a partial cross sectional elevation corresponding to Fig. 2, except that in this view the driven shaft and its attachments are decelerating and driving the de-energized motor while the spring brake band is expanded against the inner surface of the drum or shell and thereby progressively but promptly stopping the rotation of the shafts and their attachments.

Referring now to the various characters of reference on the drawing:—

11 indicates the motor generally, 12 is a general assembly of the improved apparatus, 13 is a fixed shell or drum forming part of the housing which is mounted on a base and adapted to be set in any suitable position. The housing is provided with end portions or plates 14, which have openings 15 to receive the ends of the shafts and the hubs of the cranks or crank disks mounted and secured thereon. The driving shaft is indicated as 16 on which is mounted the crank disk 17 securely keyed to said shaft by the key and keyway 18 and it is provided with a pressure or driving pin 19, which is preferably made of somewhat oval cross section, as may be seen on reference to Figs. 2, 3, and 5. This pressure pin 19 is made of this oval form in order to give it added stiffness and strength in the direction of its stress. The driven shaft is indicated as 20, on which a crank or disk 22 is mounted and keyed by the key and keyway 21, and this crank is provided with another pressure pin indicated as 23, which is also preferably made of oval cross section, for reasons similar to those above mentioned. As will be seen on reference to Figs. 2 and 3, the crank disks are cut away in order that the pressure pins 19 and 23 may cooperate with the inwardly extending hook ends 28 and 29 of the spring 25, which will be hereinafter described.

An annular groove 24 is provided in the inner surface of the circular portion of the shell or drum 13 which is adapted to act as part of an internally expanding brake adapted to receive and coact with the spring brake band 25. The brake band 25 is preferably made of a diameter, when expanded, somewhat greater than that of the groove 24, with which it cooperates, so that when it is in position, its outer surface will tend to contact with the surface of the groove 24 and thereby act by friction to stop the movement of the contacting parts.

As shown in Fig. 4, this spring brake band 25, is preferably made with one of its ends formed into a tongue or male portion 26, with bifurcations 27 on its other end, so that these two may be nested together as illustrated in Fig. 4. The tongue portion 26 of the spring 25 is provided with an inwardly extending hook portion 29, preferably formed of increased thickness in order to provide the necessary stiffness and strength and this is provided with grooved seats 32 and 33 to receive and contact with the sides of the pressure pins 19 and 23 respectively. The bifurcated portions 27 at the other end of said spring are similarly provided with the inwardly extending hook portions 28, which have similar curved seats 30 and 31 to properly receive and cooperate with the other sides of the pressure pins 19 and 23.

Reenforcing ribs or diaphragms for the crank disk 22 are indicated as 34, 35, 36 and 37 and other reenforcing ribs for the crank disk 17 are indicated as 38 and 39. The crank disk 17 is shown with a flange 40 preferably made integral therewith. This annular flange 40 is adapted to serve as a stop or seat for the spring 25 when contracted, in order to preserve its general form and resist the tendency to further diminish in diameter, due to the pull applied thereto by the pressure pins 19 and 23.

This flange 40 and the disk 17 are cut away or provided with slots on each side of the pressure pin 19 to permit the assembling and operation of the hooked ends 28 and 29 of the spring 25, the ends of such cut being indicated by the broken line at 41 in Fig. 1.

Having thus given a detailed description of the invention it will be of interest to note its operation, which is as follows:—

The parts being in the positions indicated in Figs. 1 and 2 and at rest, the motor 11 is started to rotate in a clockwise direction, when looking in the direction of its axis from its right-hand end, causing similar rotation of the driving shaft 16, its crank disk 17 and its pressure pin 19 in the direction indicated by the arrows in Figs. 3 and 5. As this is done the pressure pin 19 contacts with the hook end 28 of the spring 25, in the seat 30 and moves it into position shown in Fig. 3. This movement partially contracts the spring 25, causes its outer surface to leave the inner surface of the annular groove 24, thereby allowing it to run more freely without the full brake action and, as the rotation proceeds, the pressure pin 23 of the crank disk 22 is engaged by the seat 33 of the hook end 29 at the other end of the spring 25 and the disk 22 is thereby rotated in the direction of the curved arrow of Fig. 3. This latter engagement causes the spring band 25 to be fully released.

When it is desired to stop the rotation, the motor 11 is deenergized and the pull on the spring band being relieved, it expands to its outward position as shown in Fig. 5 and acts as a brake against the seat 24, which action decelerates and progressively stops the rotation of all the parts.

It should be noted that the preferred arrangement and proportion of parts is such that the circumferential widths of the pressure pins 19 and 23 is substantially less than the distance between the hooks 28 and 29. Thus when the mechanism is not being driven, the spring band 25 will be in its normal expanded or brake applying position, but when the motor 11 is driving and the parts assume the position shown in Figure 3, with both pressure pins in engagement with their respective hooks, the spring band 25 is then contracted, which releases its braking effect and permits the drive to run freely. When, however, the motor 11 is de-energized, the momentum of the load on the driven shaft 20 will continue the rotation of said shaft in the same direction and will become the driving shaft temporarily, with the parts assuming the position shown in Figure 5.

It is to be particularly noted in regard to the latter condition, that as soon as the motor is de-energized, the spring band 25 will expand to provide the required braking effect for the stopping of the driven shaft 20, which condition is made possible because of the very small resistance offered by the armature of the motor when running freely. In other words, the armature runs so freely that it does not impose sufficient drag to release the brake when there is a tendency for the load to drive the motor. The brake becomes effective immediately upon the de-energization of the motor and increases its braking effect proportionately as the speed of the load decreases.

It will thus be seen that on the starting of the motor, the brake is first released by the initial movement thereof, the driven shaft is then rotated, and on the de-energizing of the motor the brake is applied and progressively but promptly stops further movement.

It will also be seen that the driving and braking mechanism is extremely simple and also positive in action with few parts, thereby requiring the minimum adjustment and maintenance in order to make its action always definite to the ends desired.

Although the invention has been described and illustrated in considerable detail, it is not intended to limit it to the exact and specific details as shown and described, but to include such modifications in, substitutions for, or equivalents thereof, as are embraced within the scope of the invention, as defined in the claims.

What is claimed is:

1. A pair of coaxial rotatable shafts, and an expansibly operative brake band, said brake band being normally disconnected from said shafts, and arranged to be connected in driving relation with each of said coaxial shafts and to be contracted to fully release its braking effect when both shafts are running.

2. A driving shaft, a coaxial driven shaft, a brake having an expansible operative band, said brake band being normally disconnected from said shafts, and means for rotatably connecting said shafts by and through said brake band, and fully releasing said brake when said shafts are rotatably connected.

3. A driving shaft, a coaxial driven shaft, means for driving said shafts, an expansive brake band, said brake band being normally disconnected from, and concentrically mounted with respect to said shafts, and means for connecting said shafts with said brake band, whereby said shafts may be simultaneously driven and said brake actuated to fully release its braking effect.

4. A rotatable driving shaft, a coaxial shaft adapted to be rotated thereby, a normally expanded but contractible brake band, said brake band being normally disengaged from said shafts and concentrically mounted around the shaft ends, and means for operatively connecting said shafts through said brake band and actuating said band when both shafts are running, to fully release the braking effect, said means being also adapted to allow said brake to operate and stop all movement when said driving shaft is deenergized.

5. A driving shaft, another shaft coaxially arranged and adapted to be rotated thereby, a crank provided with a pressure member, mounted on each shaft, an expansibly operative brake band, the end portions of which are overlapping, spaced apart, and provided with hooks adapted to contact with opposite sides of the said pressure members, the distance between the contact ends of said brake band being greater than the circumferential width of said pressure members.

6. A driving shaft, provided with a crank having a pressure member, another shaft coaxially arranged and adapted to rotate therewith, said latter shaft being similarly provided with a crank, having a pressure member, an expansibly operative brake band, the ends of which are overlapping and formed to contact with said pressure members, whereby the initial rotation of one of said shafts contracts and releases the brake and its continued rotation drives the other shaft by and through said brake band.

7. A driving shaft, a coaxial driven shaft, a crank disk having a pressure pin, secured on each shaft, an expanding band brake, hooks on the ends of the brake band thereof spaced apart a greater distance than the width of each pressure pin, said hooks being disposed to be contacted by said pressure pins during their rotation in either direction.

8. A driving and a coaxial driven shaft, a crank disk, provided with a driving pin, mounted and secured on each shaft, a coaxial expansibly operative band brake, the ends of the band of which are overlapping and provided with hooks adapted to contact with said driving pins, and a drum or flange on one of said crank disks adapted to support said brake band to delimit its inoperative contraction.

9. An externally expansible band brake, a pair of adjacent shafts concentrically mounted and adapted to rotate, each shaft having a crank secured thereon, a pressure pin on each crank, the band of said brake having its ends overlapping and provided with hooks projecting into the path of rotation of said pressure pins.

10. An annular shell forming the outer member of a brake, an externally expansible brake band operably mounted therein, a pair of adjacent shafts concentrically mounted with their ends projecting into said shell, each shaft having a crank disk secured thereon, a pressure pin on each crank, the band of said brake having its ends overlapping and provided with hooks projecting into the path of rotation of said pressure pins, and a drum or flange on one of said crank disks adapted to limit the contraction of said brake band into non-operative position.

11. A stationary housing having an annular shell adapted to form the outer member of an expansively operative band brake, a brake band operably mounted therein, with its ends overlapping in tongue and groove manner, inwardly extending hooks on the ends of said brake band, a pair of adjacent rotatable shafts concentrically mounted with their ends in said shell, a crank secured on each shaft and provided with a pressure member adapted to cooperate with the hooks of said brake band.

12. An annular shell, a normally expansible brake band mounted therein, the band of said brake having overlapping ends provided with inwardly extending hooks spaced apart, a pair of rotatable coaxial shafts with their end portions mounted concentrically in said shell, a crank arm having a pressure pin, secured on the end of each shaft, said pressure pins being located between and adapted to contact with said hooks.

13. A rotatable driving shaft, a coaxial driven shaft, a band brake having an expansibly operative band adapted to be released by the initial portion of the rotation of the driving shaft in either direction, means for rotatably connecting said shafts by and through the brake band, and means for limiting the inward contraction of said brake band upon release.

14. A pair of coaxial and juxtaposed rotatable shafts, an expansibly operative band brake concentric therewith, a crank having a pressure member, secured on the ends of each shaft, the band of said brake having overlapping ends adapted to contact with said pressure members.

15. A pair of coaxial and juxtaposed shafts, an expandingly operative band brake surrounding the ends of said shafts, a crank disk, provided with a pressure member, secured on each shaft, the band of said brake having overlapping ends provided with inwardly extending hooks, said hooks being spaced apart and adapted to contact with the pressure members aforesaid, and a drum or flange on one of said crank disks, adapted to support and delimit the contracting movement of said brake band.

16. In a coupling device adapted to connect a driving shaft to a driven shaft in axial alignment therewith, a crank secured to the driving shaft and having a driving pin, a crank secured to the driven shaft and having a driven pin, a brake drum supported concentric with the shafts and held against rotation, and a spring brake band adapted to engage the drum and having one end formed to be engaged by the driving pin and one end formed to be engaged by the driven pin; said brake band being releasable from the drum by movement of the driving shaft after engagement of said band ends with said pins.

17. In a coupling adapted to connect a driving shaft to a driven shaft in axial alignment therewith to rotate it in either direction, a crank secured to the driving shaft and having a driving pin, a crank secured to the driven shaft and having a driven pin, a brake drum supported concentric with the shafts and held against rotation, and a spring brake band adapted to engage the drum and having both ends formed to engage either the driving pin or the driven pin; said brake being releasable from the drum by rotative movement of the driving shaft in either direction.

18. A pair of independently rotatable shafts, a brake member unconnected with said shaft and normally set in a braking position, and means for rotatably connecting said shafts by and through said brake member and for fully releasing the braking effect of said brake member when the rotating connection is completed and either one of said shafts is rotated to drive the other.

19. A driving shaft having substantially no load thereon, a driven shaft having a load thereon, a brake member unconnected with said shafts and normally set in a braking position, and means whereby said brake member may couple said shafts in a driving relation and fully release its braking effect when the shafts are so coupled and may make the brake effective when power to the driving shaft is discontinued.

20. In combination, a driving member, a driven member, a stationary brake member, and a spring coupling device disposed between the said driving and driven members and unconnected with each and including a braking surface normally pressed against the stationary brake member by action of the spring coupling; said spring coupling acting to operatively connect said members and to release the braking surface completely from pressing engagement with said stationary brake member when the driving member is rotated to drive a load connected to the driven member.

21. In a driving mechanism, a pair of coaxial shafts, a brake mechanism having an operable part and a stationary part normally in engagement, said movable part being adapted to operably connect said shafts together and be fully released from engagement with said stationary part when either one of said shafts is rotatably driven.

ALBERT J. HORTON.